United States Patent [19]
Ogino et al.

[11] Patent Number: 4,821,334
[45] Date of Patent: Apr. 11, 1989

[54] IMAGE PROCESSING APPARATUS

[75] Inventors: Yoshitaka Ogino, Kawasaki; Hiroshi Tanioka, Tokyo, both of Japan

[73] Assignee: Canon Kabushiki Kaisha, Tokyo, Japan

[21] Appl. No.: 812,308

[22] Filed: Dec. 23, 1985

[30] Foreign Application Priority Data

Dec. 28, 1984 [JP] Japan ............... 59-276474
Dec. 28, 1984 [JP] Japan ............... 59-276475
Dec. 28, 1984 [JP] Japan ............... 59-276494

[51] Int. Cl.$^4$ ............................. G06K 9/38
[52] U.S. Cl. ...................... 382/50; 358/283; 358/293
[58] Field of Search .............. 382/50, 51, 54, 27; 358/283, 293

[56] References Cited

U.S. PATENT DOCUMENTS 4,194,221  3/1980  Stoffel ................... 358/283
4,288,821  9/1981  Lavallee et al. ......... 358/293
4,414,581 11/1983  Kato et al. .............. 358/283
4,447,830  5/1984  Stoffel ................... 358/283
4,525,859  6/1985  Bowles et al. ........... 382/27

OTHER PUBLICATIONS

Linear Approximation of Quantized Thin Lines, S. H. Y. Hung, et al., 1983.
Offenlegungsschrift DE 3419693A1, Yokomizo, 11/29/84.

Primary Examiner—Leo H. Boudreau
Attorney, Agent, or Firm—Fitzpatrick, Cella, Harper & Scinto

[57] ABSTRACT

An image processing apparatus has an image reading unit, a two dimensional smoothing circuit, a dither processing circuit, a binarizing circuit, a discriminator, a switch and a printer. A moiré suppressed binary signal from the dither processing circuit is supplied to the printer via the switch when the discriminator discriminates a pixel of interest as a dot region. However, when the discriminator discriminates the pixel of interest as a line image region, a binary signal from the binarizing circuit is supplied to the printer via the switch.

24 Claims, 7 Drawing Sheets $px(x, y) = 16$ $pf(x, y) = 0$

IMAGE PROCESSING APPARATUS

BACKGROUND OF THE INVENTION

1. Field of the Invention

The present invention relates to an image processing apparatus having a proper image discrimination function and suitably used in a digital copying machine, a facsimile system or an electronic file.

2. Description of the Prior Art

In a conventional image processing apparatus, when an original containing both character and dot images is reproduced or coded and transmitted, identical reproduction processing identical coding/decoding cannot be performed for the entire original since different image tones (i.e., image properties or characteristics) are included in the original. For this reason, the different image tones in the original must be discriminated, and various implementations have been proposed for this purpose. However, it is difficult to provide a processing apparatus with a function for discriminating different image tones at high processing speed with a small hardware arrangement. It is also difficult to accurately discriminate a dot image and a line image such as characters.

SUMMARY OF THE INVENTION

It is an object of the present invention to eliminate the conventional drawbacks described above.

It is another object of the present invention to provide an image processing apparatus for obtaining a reproduced image of high quality.

It is still another object of the present invention to provide an image processing apparatus capable of reproducing an image with good reproducibility.

It is still another object of the present invention to improve an image processing apparatus with an image discrimination function.

It is still another object of the present invention to provide an image processing apparatus which has a small hardware arrangement and which has a function for discriminating different image tones at high speed.

It is still another object of the present invention to provide an image processing apparatus with a function accurately discriminating different images tones.

It is still another object of the present invention to provide an image processing apparatus for obtaining a reproduced image of high quality with a simple system configuration.

The above and other objects of the present invention will be apparent from the following detailed description and the appended claims in conjunction with the accompanying drawings.

DETAILED DESCRIPTION OF THE PREFERRED EMBODIMENTS

Preferred embodiments of the present invention will be described with reference to the accompanying drawings.

Figure 1:
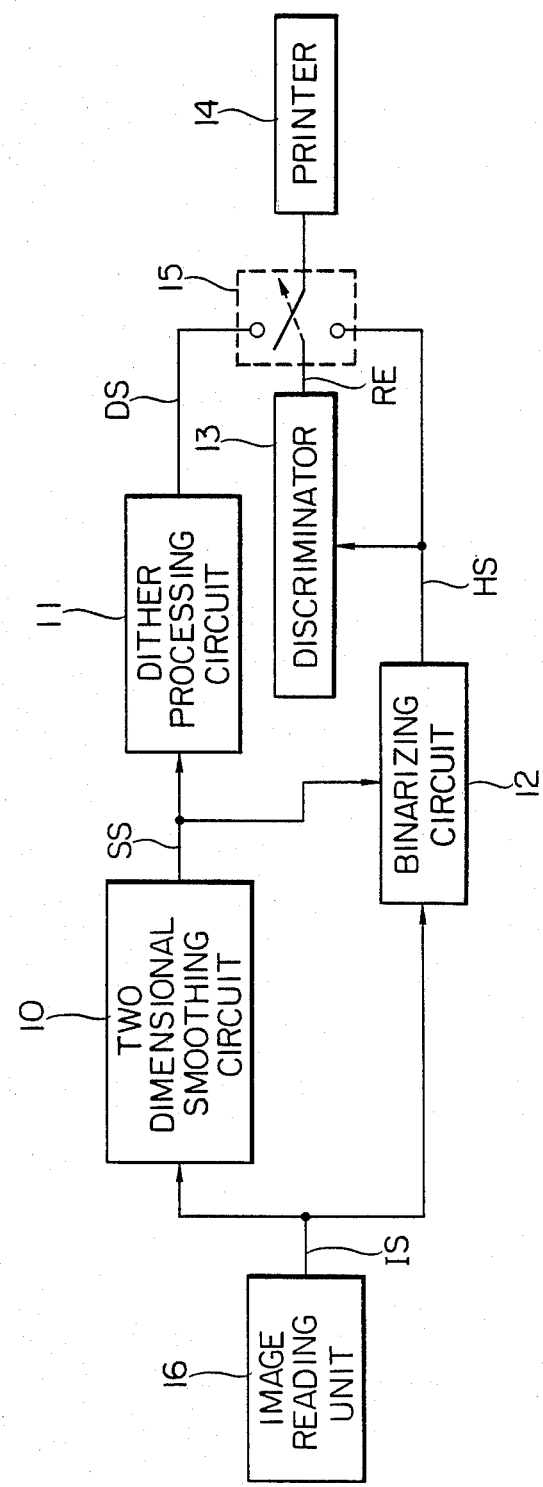
FIG. 1 is a block diagram of an image processing apparatus according to a first embodiment of the present invention.

FIG. 1 is a block diagram of an image processing apparatus according to an embodiment of the present invention. An image reading unit 16 has an image sensor such as a CCD which reads an original. The image reading unit 16 then generates 6-bit image data IS. The image sensor is a line sensor for electrically scanning the original along a line direction (i.e., a main scanning direction) and mechanically scanning the original along a direction (i.e., a subscanning direction) perpendicular to the line direction. A two dimensional smoothing circuit 10 two-dimensionally smooths the 6-bit image data IS. A dither processing circuit (or dithered binarizing circuit) 11 performs dither processing (halftone processing) for the image data (i.e., a smoothed signal SS) smoothed by the two dimensional smoothing circuit 10 in accordance with a predetermined dither matrix, so that the image data is binarized. A moiré suppressed binary signal DS is generated by the dither process circuit 11. A binarizing circuit 12 receives the 6-bit image data IS and binarizes it by using the smoothed signal SS as a threshold value.

By using the smoothed image data SS as a threshold value, a character portion which almost cannot be distinguished from a background image (i.e., the original sheet texture) can be extracted and reproduced. A discriminator 13 receives a binary signal (i.e., a high-resolution signal) from the binarizing circuit 12 and discriminates the image tone. The discriminator 13 counts features (to be described later) in a matrix near the pixel of interest. The features are subjected to threshold processing to discriminate the image tone. A switch 15 is operated in response to the image tone discrimination result RE to select one of the binary signals HS and DS, and the selected signal is supplied to a printer 14 such as a laser beam printer. As may be apparent from the above description, the discriminator 13 selects the moiré suppressed binary signal DS when the pixel of interest is discriminated as a dot region, but the binary signal HS when the pixel of interest such as a character is discriminated as a line region.

Two dimensional smoothing circuit in FIG. 1 is described in detail in Japanese Patent Application No. 246131/1984 filed by the present applicant, and a detailed description thereof will be omitted.

The discriminator 13 shown in FIG. 1 will be described in detail. In order to best understand the discriminator 13, a discrimination algorithm used in this embodiment will be described in detail first. The following two features are considered to discriminate a character image and a dot image.

(1) In general, a difference between the features of a character and a dot image depends on their spatial frequencies. A dot image has a high spatial frequency along two orthogonal directions. However, a line image such as a character has a high spatial frequency along one of the directions.

(2) The dots are regarded as an aggregate of circular dots, while a character (especially, a kanji character) comprises by an aggregate of lines crossing each other.

The discrimination algorithm used in this embodiment is based on the difference between the frequency components of the dot and line images. A character (e.g., a kanji character) which has been erroneously discriminated as a dot in a conventional apparatus can be discriminated from a dot image with a large number of lines, that is, a fine dot image.

In this embodiment, a feature Pf(x,y) of each pixel is calculated to identify an image tone thereof.

In a region of binary pixels $(2n+1) \times (2m+1)$ (where n and m are natural numbers, near a binary pixel P(x,y), the feature Pf(x,y) is defined as follows:

$$Pf(x,y) = \sum_{j=-n}^{n} \sum_{i=-m}^{m} [P(-1,0) \cdot P(0,-1) + P(1,0) \cdot P(0,-1) + P(-1,0) \cdot P(0,1) + P(0,1) \cdot P(1,0)] \quad (1)$$

for $IP(l,s) = P(x+i, y+j) \otimes P(x+i+l, y+j+s)$ where $\otimes$ is exclusive OR and $\cdot$ is logical AND.

Figure 2A:
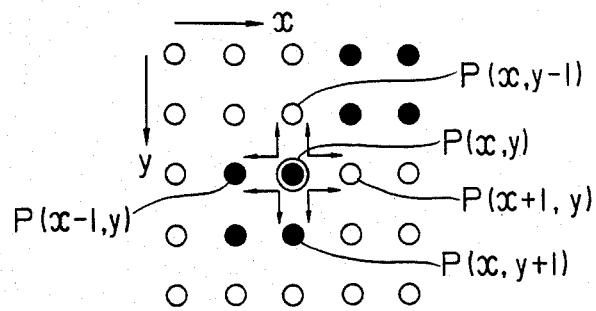
FIGS. 2A, 2B and 2C are illustrative representations for explaining an image tone discrimination algorithm used in the image processing apparatus in FIG. 1.
Figure 2B:
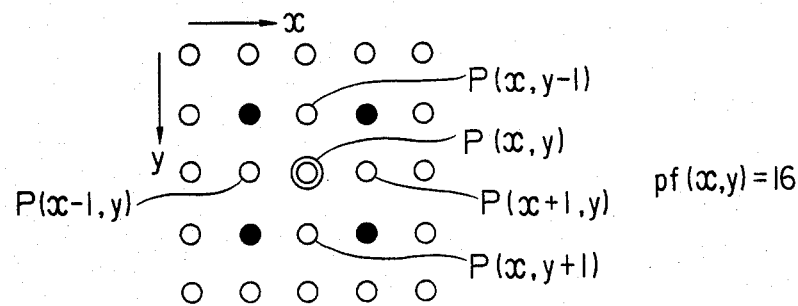
Figure 2C:
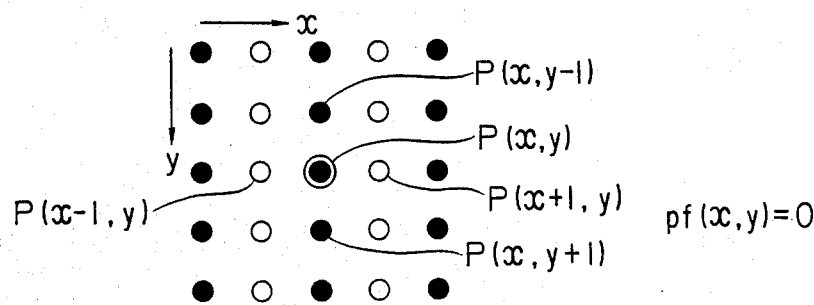

A binary image matrix around a binary image P(x,y) is illustrated in FIGS. 2A to 2C to explain the physical meaning of the feature Pf(x,y). It should be noted the binary image is represented by the binary signal HS from the binarizing circuit 12.

FIGS. 2A to 2C show binary states of 25 pixels including the pixel P(x,y) (center in FIGS. 2A to 2C) of interest. A black dot "●" represents a black pixel, and a hollow dot "○" represents a white pixel. When the pixel of interest has a black level, the pixel of interest is represented by symbol "⊙". However, when the pixel of interest has a white level, the pixel of interest is represented by symbol "◉". As is apparent from FIGS. 2A to 2C, independency and linearity of the pixel P(x,y) of interest with respect to four adjacent pixels P(x−1,y), P(x+1,y), P(x,y−1) and P(x,y+1) can be detected in accordance with the states of the four adjacent pixels. Referring to FIG. 2A, $P(-1,0) = P(x,y) \otimes P(x-1,y) = 0$ $P(1,0) = P(x,y) \otimes P(x+1,y) = 1$ $P(0,-1) = P(x,y) \otimes P(x,y-1) = 1$ $P(0,1) = P(x,y) \otimes P(x,y+1) = 0$ Therefore, $P(-1,0) \cdot P(0,-1) = 0$ $P(1,0) \cdot P(0,-1) = 1$ $P(-1,0) \cdot P(0,1) = 0$ $P(0,1) \cdot P(1,0) = 0$ There is one array $P(x,y-1) \cdot P(x+1,y)$ by which the levels of two adjacent orthogonal pixels (e.g., P(x,y−1) and P(x+1,y)) are simultaneously inverted with respect to the pixel of interest. This array is called an inverted array hereinafter. Similarly, the number of inverted arrays around the pixel of interest is counted, and sums of the inverted arrays for all pixels around the pixel of interest are accumulated to obtain the feature Pf(x,y).

The difference between the dot feature Pf(x,y) and the character feature Pf(x,y) will be described with reference to FIGS. 2B and 2C. FIG. 2B shows states of pixels for a dot. If n=m=1 in equation (1), then Pf(x,y)=16. Similarly, FIG. 2C shows states of pixels for a thin line. In this case, Pf(x,y)=0. Therefore, when the features Pf(x,y) are compared with a threshold value, a dot region can be discriminated from a line image region such as a character in principle.

In fine, if Pf(x,y)>K, for an appropriate K (based upon experience) the pixel P(x,y) of interest belongs to a dot region, but if Pf(x,y)≦K, it belongs to a line image region.

By using the above algorithm, dot and character images of 100 lines/inch or more are discriminated from each other. The dot image is processed by the dither processing circuit 12 (FIG. 1) in accordance with moiré suppressed dither processing, and the character image is binarized by the binarizing circuit 12. In this case, m=n=3 and K=16 to 20 are proper conditions.

Figure 3A:
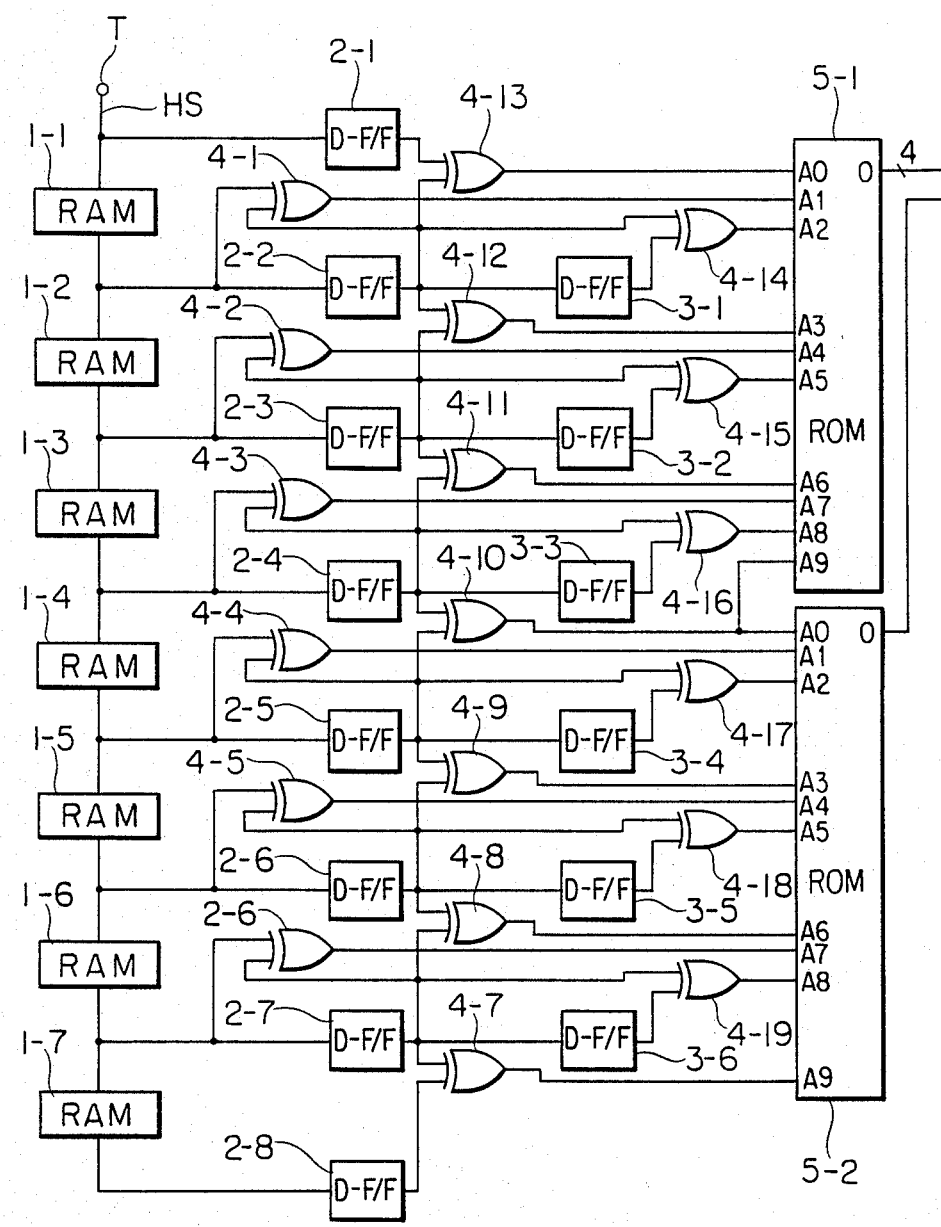
FIGS. 3A and 3B is a circuit diagram of a discriminator 13 in the image processing apparatus in FIG. 1.
Figure 3B:
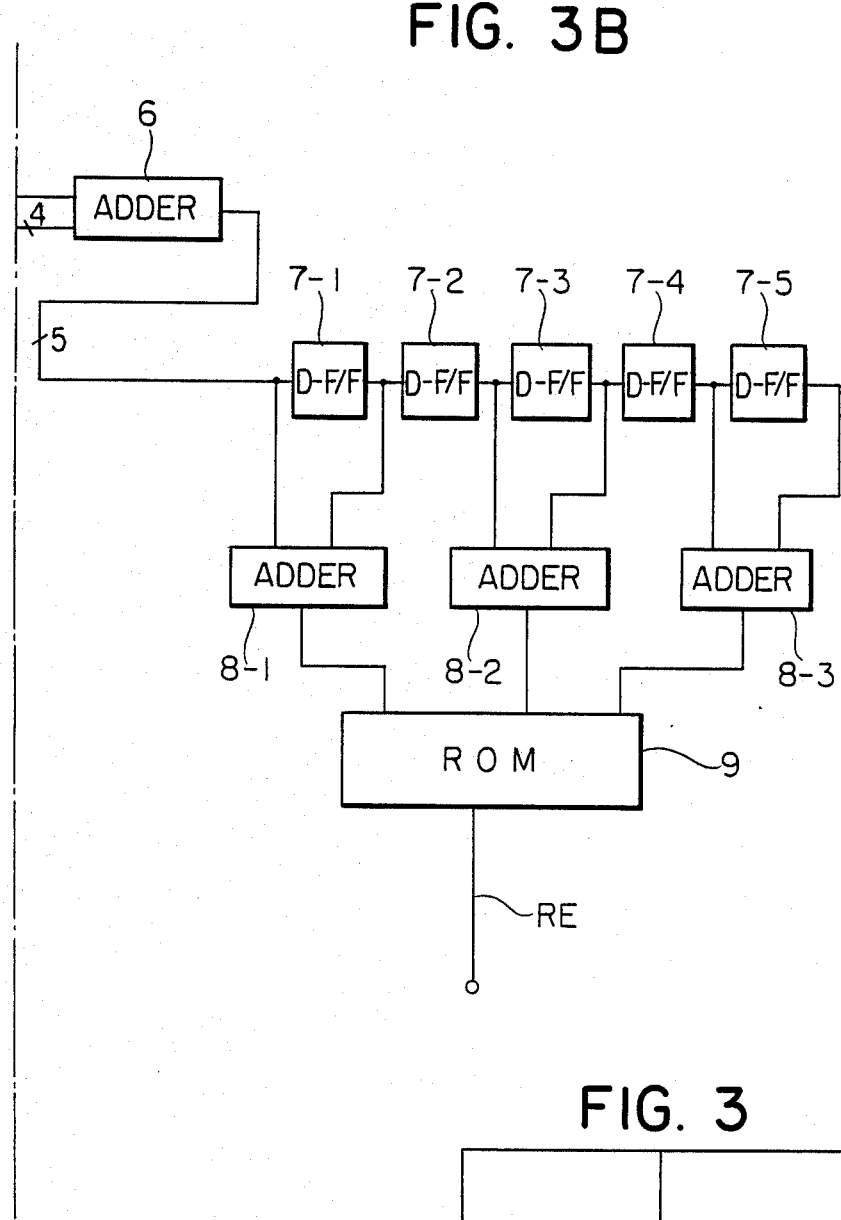
Figure 3:
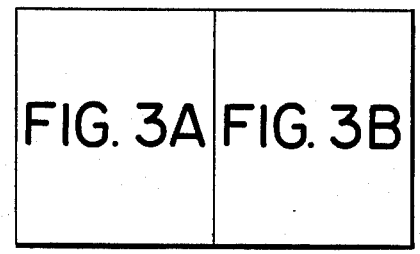
FIG. 3, comprising

The circuit arrangement of the discriminator 13 will be described with reference to FIG. 3. The circuit in FIG. 3 performs the above-mentioned algorithm so as to count features Pf(x,y) in a matrix of 6×6 pixels including each pixel of interest.

4-Kbit static RAMs 1-1 to 1-7 sequentially receive the binary signals HS and delay them by one line along the subscanning direction. Delayed flip-flops (to be referred to as D-F/Fs hereinafter) 2-1 to 2-8 delay the input from a terminal T and outputs from the static RAMs 1-1 to 1-7 by one pixel along the main scanning direction. D-F/Fs 3-1 to 3-6 delay the outputs from the D-F/Fs 2-2 to 2-7 by one pixel. Therefore, a two-dimensional binary image corresponding to the original and consisting 8 pixels along the subscanning direction and 3 pixels along the main scanning direction can be simultaneously detected at outputs of the static RAMs 1-1 to 1-7 and D-F/Fs 2-1 to 2-8 and 3-1 to 3-8. Exclusive OR gates (to be referred to as EX-OR gates hereinafter) 4-1 to 4-19 calculate an exclusive OR sum of pixels adjacent to six pixels corresponding to outputs from the D-F/Fs 2-2 to 2-27. ROMs 5-1 and 5-2 receive calculation results of the 19 EX-OR gates, determine whether or not the two orthogonal adjacent pixels among the six pixels ar simultaneously inverted with respect to the pixel of interest, and count the inverted arrays. In this embodiment, the ROMs 5-1 and 5-2 are $2^{10}(=1 K)$ word ROMs. The output from the EX-OR gate 4-10 is supplied to the ROMs 5-1 and 5-2. Therefore, the ROMs 5-1 and 5-2 perform the above discrimination and counting, in units of 3 pixels. Outputs from the ROMs 5-1 and 5-2 are added by an adder 6. A sum signal from the adder 6 it is supplied to adders 8-1 to 8-3 through D-F/Fs 7-1 to 7-5 for sequentially delaying the sum signal. The adders 8-1 to 8-3 and the above calculation results of two lines each. A sum signal from each adder is supplied to a ROM 9. Therefore, a signal corresponding to the feature Pf(x,y) obtained from the 6×6 pixel matrix in accordance with equation (1) is supplied to the address input terminal of the ROM 9. The ROM 9 has a table with addresses accessed by the outputs from the adders 8-1 to 8-3. The table stores 1-bit discrimination result RE representing whether an input image is a dot or line image. The ROM 9 receives the feature Pf(x,y) and then generates a comparison result (i.e., the 1-bit discrimination signal RE) representing whether or not the feature Pf(x,y) is larger than a value K.

Real-time image discrimination processing can be formed by a simple circuit arrangement using memories and gate circuits such as RAMs and ROMs as described with reference to FIG. 3.

A second embodiment of the present invention will be described with reference to FIGS. 1, 4A to 4C and 5. The apparatus of the second embodiment is substantially the same as that of the first embodiment except for the arrangement of the discriminator 13, and a description of the same circuits as in FIG. 1 will be omitted.

A discrimination algorithm in the second embodiment will be described.

The second embodiment is also based on the two features for discriminating a dot image from line image such as a character as described with reference to the first embodiment. More particularly, the apparatus of the second embodiment operates based on the difference between the frequency components in dot and line images. A character which has been erroneously discriminated as a dot in a conventional apparatus can be discriminated from a dot image with a large number of lines, that is, a fine dot image.

In the second embodiment, a feature Pf(x,y) of each pixel is calculated to identify an image tone thereof in the same manner as in the first embodiment.

Figure 4A:
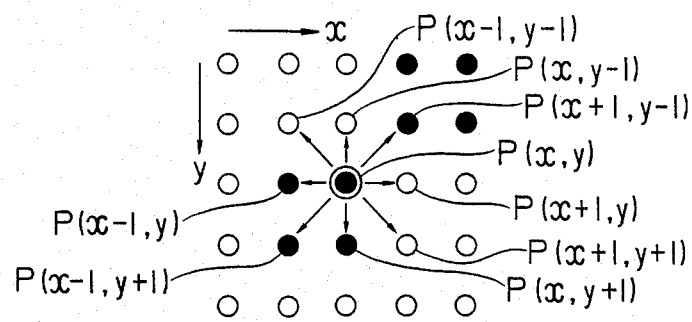
FIGS. 4A, 4B and 4C are illustrative representations explaining an image tone discrimination algorithm according to a second embodiment of the present invention.
Figure 4B:
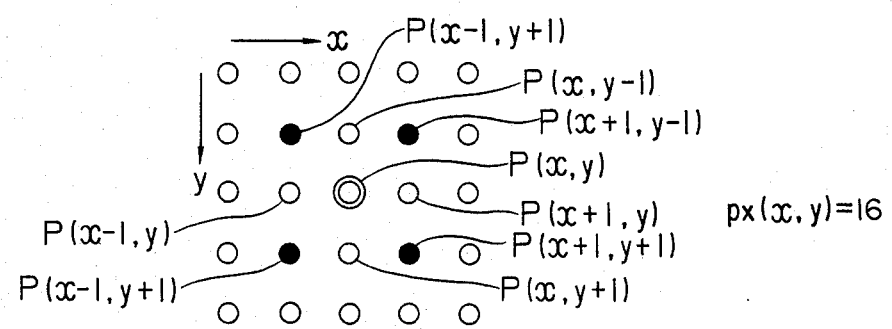
Figure 4C:
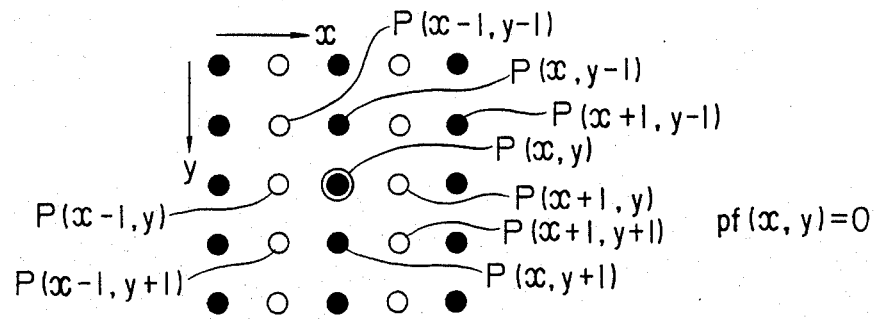

In a region of binary pixels $(2n+1) \times (2m+1)$ (where n and m are natural numbers) near a binary pixel P(x,y), the feature Pf(x,y) is defined as follows, only if all the following conditions are satisfied:

$$Pf(x,y) \equiv \sum_{j=-n}^{n} \sum_{i=-m}^{m} [\bar{P}(-1, -1) \cdot \bar{P}(+1, +1) + \bar{P}(0, -1) \cdot \quad (2)$$

$$\bar{P}(0, +1) + \bar{P}(+1, -1) \cdot \bar{P}(-1, +1) + \bar{P}(-1,0) \cdot \bar{P}(+1,0)]$$

for $\bar{P}(l,s) \equiv P(x + i, y + j) \otimes P(x + i, y + j + s)$ where $\otimes$ is the exclusive OR and $\cdot$ logical AND and wherein the conditions are given below:

$P(x,y)+P(x-1,y) \neq 0$ $P(x,y)+P(x-1,y), +P(x+1,y) \neq 3$ $P(x,y)+P(x,y-1)+P(x,y+1) \neq 0$ $P(x,y)+P(x,y-1)+P(x,y+1) \neq 3$ A binary pixel P(x,y) and adjacent binary image array are illustrated in FIGS. 4A to 4C. The physical meaning of the feature Pf(x,y) will be described below. It should be noted that the binary image is constituted by the binary image HS generated by a binarizing circuit 12 in FIGS. 4A to 4C.

FIGS. 4A to 4C show binary states of 25 pixels including the pixel P(x,y) (center in FIGS. 4A to 4C) of interest. A black dot "●" represents a black pixel, and a hollow "○" dot represents a white pixel. When the pixel of interest has a black level, the pixel of interest is represented by symbol "⊙". However, when the pixel of interest has a white level, the pixel of interest is represented by symbol " ⊚ ". As is apparent from FIGS. 2A to 2C, independence and linearity of the pixel P(x,y) of interest with respect to eight adjacent pixels P(x−1,y), P(x+1,y), P(x−1,y−1), P(x+1,y+1), P(x+1,y−1), P(x,y−1) and P(x,y+1) can be detected in accordance with the states of the four adjacent pixels. Referring to FIG. 4A, $\bar{P}(-1,0) = \bar{P}(x,y) \otimes \bar{P}(x-1,y) = 0$ $\bar{P}(1,0) = \bar{P}(x,y) \otimes \bar{P}(x+1,y) = 1$ $\bar{P}(0,-1) = \bar{P}(x,y) \otimes \bar{P}(x,y-1) = 1$ $\bar{P}(0,1) = \bar{P}(x,y) \otimes \bar{P}(x,y+1) = 0$ $\bar{P}(-1,-1) = \bar{P}(x,y) \otimes \bar{P}(x-1,y-1) = 1$ $\bar{P}(1,1) = \bar{P}(x,y) \otimes \bar{P}(x+1,y+1) = 1$ $\bar{P}(1,-1) = \bar{P}(x,y) \otimes \bar{P}(x+1,y-1) = 0$ $\bar{P}(-1,1) = \bar{P}(x,y) \otimes \bar{P}(x-1,y+1) = 0$ Therefore, $\bar{P}(-1,-1) \cdot \bar{P}(1,1) = 0$ $\bar{P}(0,-1) \cdot \bar{P}(0,1) = 0$ $\bar{P}(1,-1) \cdot \bar{P}(-1,1) = 0$ $\bar{P}(-1,0) \cdot \bar{P}(1,0) = 0$ There is one array $P(x-1,y-1) \rightarrow P(x,y) \rightarrow P(x+1,y+1)$ by which the levels of two adjacent orthogonal pixels (e.g., P(x,y−1) and P(x,y+1)) are simultaneously inverted with respect to the pixel of interset. This array is called an inverted array hereinafter. Similarly, the number of inverted arrays around the pixel of interest is counted, and sums of the inverted arrays for all pixels around the pixel of interest are accumulated to obtain the feature Pf(x,y).

The difference between the dot feature Pf(x,y) and the character feature Pf(x,y) will be described with reference to FIGS. 4B and 4C. FIG. 4B shows states of pixels for a dot. If n=m=1 in equation (2), the Pf(x,y)=20. Similarly, FIG. 4C shows states of pixels for a thin line. In this case, Pf(x,y)=0. Therefore, the features Pf(x,y) are compared with a threshold value, and a dot region can be discriminated from a line image region such as a character in principle.

In fine, if Pf(x,y) > K, for a suitable K, the pixel P(x,y) of interest belongs to the dot region, but if Pf(x,y) ≦ K, it belongs to the line image region.

By using the above algorithm, dot and character images of 100 lines/inch or more are discriminated from each other. The dot image is processed by the dither processing circuit 11 (FIG. 1) in accordance with moiré suppressed dither processing, and the character image is binarized by the binarizing circuit 12. In this case, m=n=3 and K=16 to 20 are proper conditions.

The circuit arrangement of the discriminator 13 will be described with reference to FIG. 5. The circuit in FIG. 3 performs the above-mentioned algorithm so as to count features Pf(x,y) in a matrix of 6×6 pixels including the pixel of interest.

4-Kbit static RAMs 1′−1 to 1′−7 sequentially receive the binary signals HS and delay them by one line along the subscanning direction. Delayed flip-flops (to be referred to as D-F/Fs hereinafter) 2′−1 to 2′−8 delayed the input from a terminal T and outputs from the static RAMs 1′−1 to 1′−7 by one pixel along the main scanning direction. D-F/Fs 3′−1 to 3′−8 delay the outputs from the D-F/Fs 2′−1 to 2′−8 by one pixel. Therefore, a two dimensional binary image corresponding to the original and consisting of 8 pixels along the subscanning direction and 3 pixels along the main scanning direction can be simultaneously detected at outputs of the static RAMs 1'—to 1'—7 and D-F/Fs 2'—1 to 2'—8 and 3'—1 to 3'—8. Exclusive OR gates (to be referred to as EX-OR gates hereinafter) 4'—1 to 4'—23 calculate exclusive OR products of pixels adjacent to six pixels corresponding to outputs from the D-F/Fs 2'—2 to 2'—7. ROMs 5'—1 and 5'—2 receive calculation results of the 23 EX-OR gates, determine whether or not the two orthogonal adjacent pixels among the six pixels are simultaneously inverted with respect to the pixel of interest, and count the inverted arrays. In this embodiment, ROMs 5'—1 and 5'—2 are $2^{12}(=4K)$ work ROMs. The output from the EX-OR gate 4'—12 is supplied to the ROMs 5'—1 and 5'—2. Therefore, the ROMs 5'—1 and 5'—2 perform the above discrimination and counting, in units of 3 pixels. Outputs from the ROMs 5'—1 and 5'—2 are added by an adder 6'. A sum signal (an accumulated value of inverted arrays for 6 pixels) from the adder 6' is supplied to adders 8'—1 to 8'—3 through D-F/Fs 7'—1 to 7'—5 for sequentially delaying the sum signal. The adders 8'—1 to 8'—3 add the above calculation results of two lines each. A sum signal from each adder is supplied to a ROM 9'. Therefore, a signal corresponding to the feature Pf(x,y) obtained from the 6×6 pixel matrix in accordance with equation with equation (2) is supplied to the address input terminal of the ROM 9'. The ROM 9' has a table with addresses accessed by the outputs from the adders 8'—1 to 8'—3. The table stores 1-bit discrimination sult RE representing whether an the feature Pf(x,y) represents a dot or line image. The ROM 9' receives the feature Pf(x,y) and then generates a comparison result (i.e., the 1-bit discrimination signal RE) representing whether or not the feature Pf(x,y) is larger than a value K.

Figure 5A:
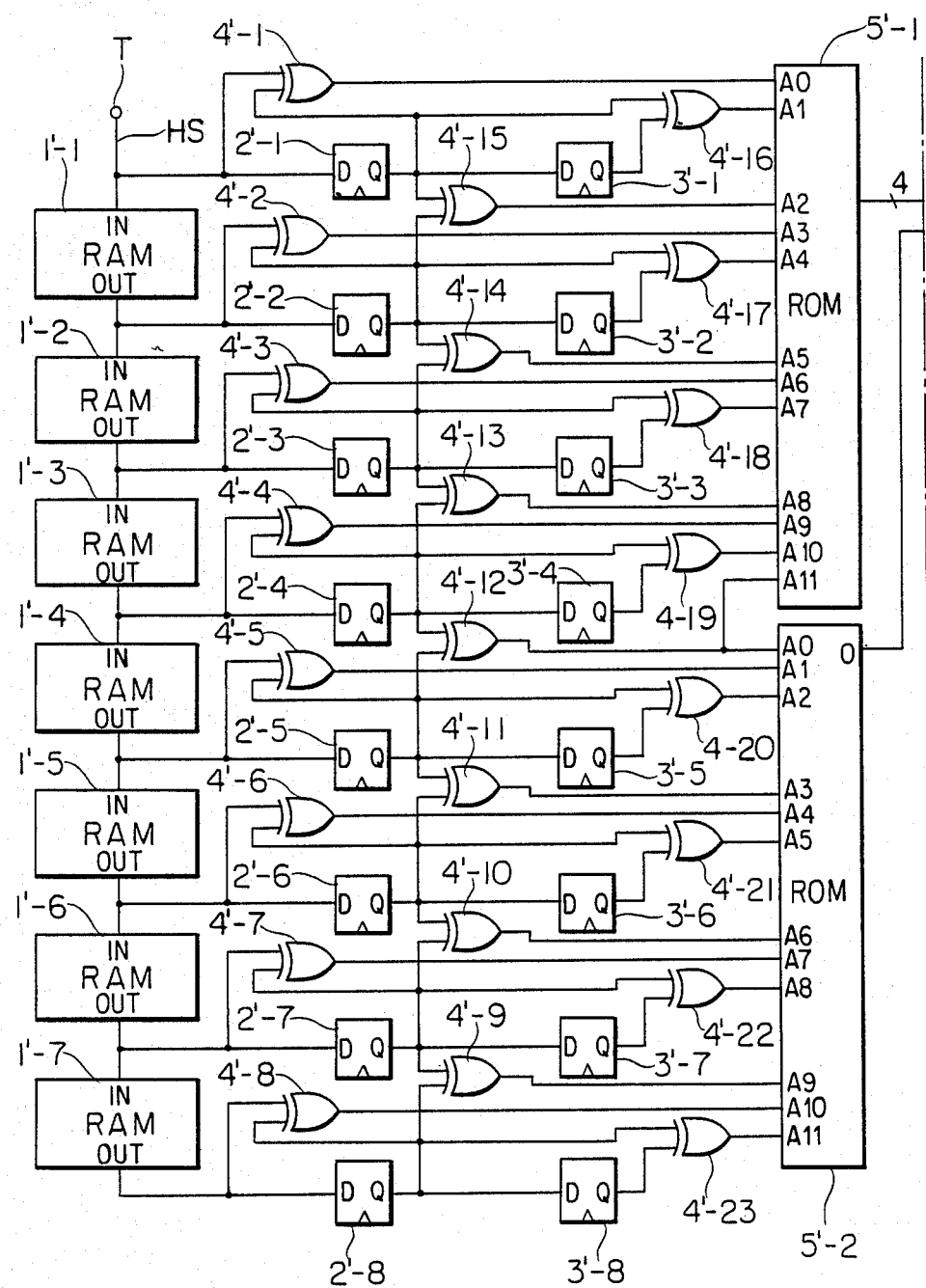
FIGS. 5A and 5B is a circuit diagram of a discriminator 13 according to the second embodiment of the present invention.
Figure 5B:
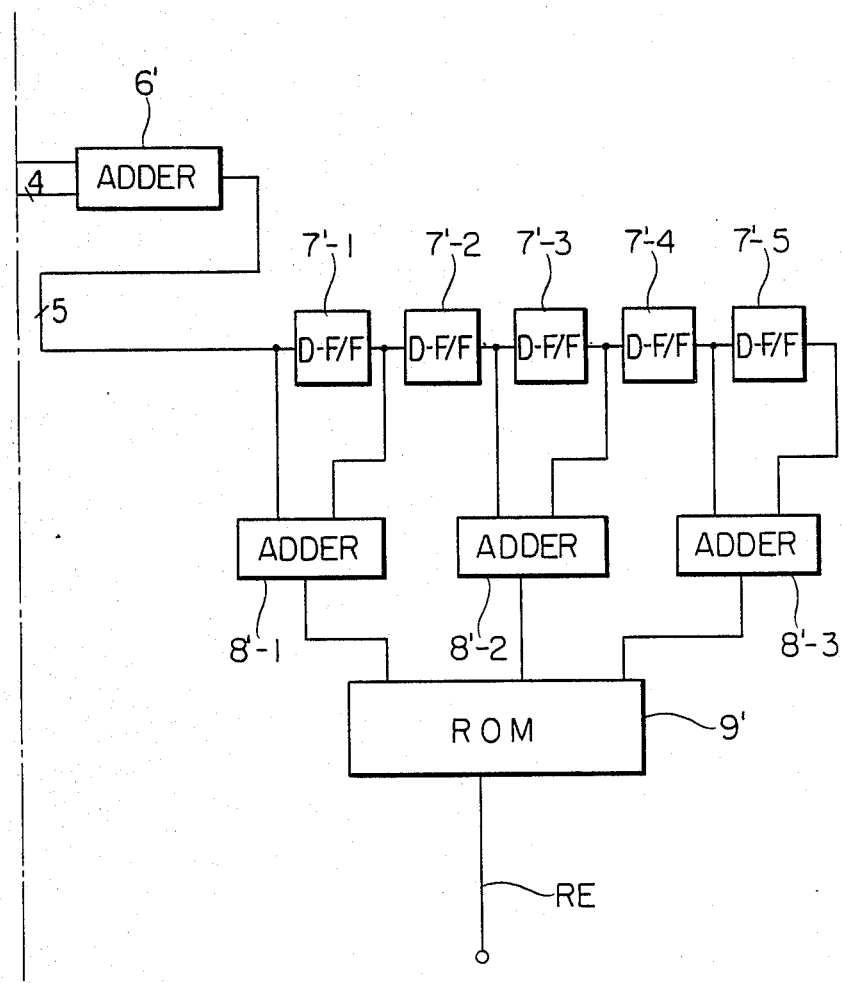
Figure 5:
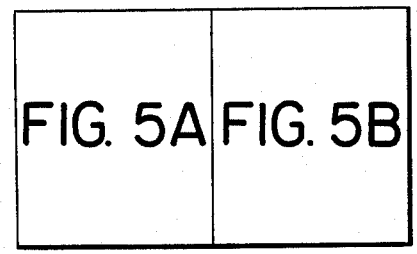
FIG. 5, comprising

Real-time image discrimination processing can be performed by a simple circuit arrangement using memories and gate circuits such as RAMs and ROMs as described in FIG. 5.

The image processing aparatus is arranged to discriminate the image tone in accordance with the spatial frequency characteristics and linearity, so that the image can be discriminated with high precision. In particular, the character image such as a kanji character constituted by thin lines can be accurately discriminated from a dot image.

In the above embodiment, the smoothed signal SS is used as a threshold value. The 6-bit image data IS is binarized to obtain the binary signals HS. By using this binary signal HS, each pixel of interest is discriminated. However, the image data IS may be binarized to obtain a binary signal, and this binary signal can be used to discriminate each pixel of interest.

The present invention is not limited to the particular embodiments described above. Various changes and modifications may be made within the spirit and scope of the appended claims.

What we claim is:

1. An image processing apparatus comprising:
   means for inputting pixel data; and
   means for processing the pixel data inputted by means of said input means,
   wherein said processing means has means for discriminating an image tone of the pixel data for each pixel, and said discriminating means discriminates both spatial frequency characteristics of pixel data of interest and a linearity of the pixel data of interest with respect to adjacent pixel data thereto, in connection with a plurality of directions, on the basis of the pixel data of interest and the adjacent pixel data, and discriminates the image tone of the pixel data of interest.

2. An apparatus according to claim 1, wherein said discriminating means comprises means for calculating an exclusive OR sum of both the pixel data of interest and the adjacent pixel data, and means for determining the image tone of the pixel data of interest in accordance with the result of calculation by said calculating means.

3. An apparatus according to claim 2, wherein said processing means comprises binarizing means for binarizing the input pixel data and generating binary data, and said discriminating means discriminates the image tone of the pixel data of interest by using the binary data.

4. An apparatus according to claim 1, wherein said processing means comprises first processing means for processing the input pixel data in a first mode, second processing means for processing the input pixel data in a second mode, and means for selecting one of outputs from said first and second processing means.

5. An apparatus according to claim 1, wherein said discriminating means discriminates whether the image data of interest is a dot image or not.

6. An apparatus according to claim 4, wherein said first processing means includes smoothing means for smoothing the input pixel data and halftone processing means for halftone processing an output from said smoothing means, said second processing means includes binarizing means for binarizing the input pixel data, and wherein said selecting means selects between an output of said halftone processing means and an output of said binarizing means in accordance with the discrimination result by said discriminating means.

7. An apparatus according to claim 6, wherein said discriminating means discriminates an image tone of the pixel data of interest by using the binary data outputted from said binarizing means.

8. An apparatus according to claim 6, wherein said binarizing means binarizes the input pixel data by using an output from said smoothing means.

9. An image processing apparatus comprising:
   means for inputting pixel data; and means for processing the pixel data inputted by said means of said input means,
   wherein said processing means has means for discriminating an image tone of the pixel data for each pixel, and said discriminating means discriminates both spatial frequency characteristics of pixel data of interest and independence of the pixel data of interest with respect to adjacent pixel data thereto, in connection with a plurality of directions, on the basis of the pixel data of interest and the adjacent pixel data, and discriminates the image tone of the pixel data of interest.

10. An apparatus according to claim 9, wherein said discriminating means comprises means for calculating an exclusive OR sum of both the pixel data of interest and the adjacent pixel data, and means for determining the image tone of the pixel data of interest in accordance with the result of calculation performed by said calculating means.

11. An apparatus according to claim 9, wherein said processing means comprises binarizing means for binarizing the input pixel data and generating binary data, and said discriminating means discriminates the image tone of the pixel data of interest by using the binary data.

12. An apparatus according to claim 9, wherein said processing means comprises first processing means for processing the input pixel data in a first mode, second processing means for processing the input pixel data in a second mode, and means for selecting one of outputs from said first and second processing means.

13. An apparatus according to claim 9, wherein said discriminating means discriminates whether the pixel data of interest is a dot image or a line image.

14. An apparatus according to claim 12, wherein said first processing means includes smoothing means for smoothing the input pixel data and halftone processing means for halftone processing an output from said smoothing means, said second processing means includes binarizing means for binarizing the input pixel data, and wherein said selecting means selects an output of said halftone processing means or an output of said binarizing means in accordance with a result of discrimination performed by said discriminating means.

15. An apparatus according to claim 14, wherein said discriminating means discriminates an image tone of the pixel data of interest by using the binary data outputted from said binarizing means.

16. An apparatus according to claim 14, wherein said binarizing means binarizes the input pixel data by using an output from said smoothing means.

17. An apparatus according to claim 2, wherein said calculating means calculates an exclusive OR sum relating to pixel data in a predetermined two-dimensional area including the pixel data of interest.

18. An apparatus according to claim 10, wherein said calculating means calculates an exclusive OR sum relating to pixel data in a predetermined two-dimensional area including the pixel data of interest.

19. An apparatus according to claim 3, wherein said calculating means calculates an exclusive OR sum between the pixel data of interest and each of at least two adjacent pixel data which are displaced from the pixel data of interest in directions perpendicular to each other.

20. An apparatus according to claim 10, wherein said calculating means calculates an exclusive OR sum between the pixel data of interest and each of at least two adjacent pixel data which are displaced from the pixel data of interest in directions perpendicular to each other.

21. An apparatus according to claim 1, wherein said discriminating means discriminates a linearity of the pixel data of interest with respect to the adjacent pixel data thereto, in a two-dimensional direction.

22. An apparatus according to claim 14, wherein said discriminating means discriminates an independence of the pixel data of interest with respect to adjacent pixel data thereto, in each of two dimensions.

23. An apparatus according to claim 1, wherein said discriminating means includes means for performing predetermined operations on the image data of interest and on the adjacent image data, respectively, and for thus deducing a plurality of operational results, and means for determining an image tone of the image data of interest on the basis of the plural operational results.

24. An apparatus according to claim 14, wherein said discriminating means includes means for performing predetermined operations on the image data of interest and on the adjacent image data, respectively, and thus deducing a plurality of operational results, and means for determining an image tone of the image data of interest on the basis of the plural operational results.

* * * * *

UNITED STATES PATENT AND TRADEMARK OFFICE
CERTIFICATE OF CORRECTION

PATENT NO. : 4,821,334
DATED : April 11, 1989
INVENTOR(S) : YOSHITAKA OGINO, ET AL.

It is certified that error appears in the above-identified patent and that said Letters Patent is hereby corrected as shown below:

COLUMN 3

Line 60, "P(x,y-1)∴P(x+1,y)" should read --P(x,y-1)→P(x,y)→P(x+1,y)--.

COLUMN 4

Line 35, "ing 8" should read --ing of 8--.

COLUMN 5

Line 36, "for IP(1,s)" should read --for ₱(1,s)--.
    Line 40, "P(x,y)+P(x-1,y)≠0" should read --P(x,y)+P(x-1,y)+P(x+1,y)≠0--.
    Line 57, "holow" should read --hollow--.
    Line 65, "P(x,y-1) and P(x,y+1)" should read --P(x-1,y+1), P(x,y-1) and P(x,y+1)--.

COLUMN 6

Line 1, "₱(-1,0)= ,y) ⊗ (x-1,y)=0" should read --₱(-1,0)=₱(x,y) ⊗ ₱(x-1,y)=0--.
    Line 6, "₱(0,1)= (x,y) ⊗ x,y+1)=0" should read --₱(0,1)=₱(x,y) ⊗ ₱(x,y+1)=0--.
    Line 7, "₱(-1,-1)=₱(x,y) ⊗ ₱(x-1,y-1,y-1)=1" should read --₱(-1,-1)=₱(x,y) ⊗ ₱(x-1,y-1)=1--.

UNITED STATES PATENT AND TRADEMARK OFFICE
CERTIFICATE OF CORRECTION

PATENT NO. : 4,821,334
DATED : April 11, 1989
INVENTOR(S) : YOSHITAKA OGINO, ET AL.

It is certified that error appears in the above-identified patent and that said Letters Patent is hereby corrected as shown below:

COLUMN 6

Line 9, "$P(1,1)= (x,y) \otimes P(x+1,y+1)=1$" should read
--$P(1,1)=P(x,y) \otimes P(x+1,y+1)=1$--.

Line 13, "$P(-1,1)=R(x,y) \otimes (x-1,y+1)=0$" should read
--$P(-1,1)=R(x,y) \otimes P(x-1,y+1)=0$--.

Line 21, "$P(,-1) \cdot P(-1,1)=0$" should read
--$P(1,-1) \cdot P(-1,1)=0$--.

Line 37, "the" should read --then--.

Line 38, "$Pf(x,y)=20$." should read --$Pf(x,y)=16$--.

COLUMN 7

Line 2, "RAMs 1'-to 1'-7" should read
--RAMs 1'-1 to 1'-7--.

Line 26, "with equation" (first occurrence) should be deleted.

Line 30, "sult" should read --result-- and "an" should be deleted.

UNITED STATES PATENT AND TRADEMARK OFFICE
CERTIFICATE OF CORRECTION

PATENT NO. : 4,821,334
DATED : April 11, 1989
INVENTOR(S) : YOSHITAKA OGINO, ET AL.   Page 3 of 3

It is certified that error appears in the above-identified patent and that said Letters Patent is hereby corrected as shown below:

COLUMN 8

Line 45, "and means" should read --and ¶ means--.

Signed and Sealed this

Sixth Day of March, 1990

Attest:

JEFFREY M. SAMUELS

*Attesting Officer*   Acting Commissioner of Patents and Trademarks